United States Patent [19]
Dunmire et al.

[11] 3,867,764
[45] Feb. 25, 1975

[54] AIMING LIGHT AND AIMING LIGHT ADAPTER FOR USE ON A WEAPON

[75] Inventors: Howard L. Dunmire, Woodbridge; Michael Hacskaylo, Falls Church, both of Va.

[73] Assignee: The United States of America as represented by the Secretary of the Army, Washington, D.C.

[22] Filed: Apr. 24, 1973

[21] Appl. No.: 354,034

[52] U.S. Cl................ 33/241, 33/DIG. 21, 240/6.41
[51] Int. Cl................................................ F41g 1/34
[58] Field of Search............... 33/241, 286, DIG. 21; 240/6.41, 2 F

[56] References Cited
UNITED STATES PATENTS

| | | | |
|---|---|---|---|
| 2,394,521 | 2/1946 | Lynn | 240/6.41 |
| 2,529,057 | 11/1950 | Teffault | 33/241 |
| 2,826,677 | 3/1958 | Jobanek | 240/6.41 |
| 3,612,949 | 10/1971 | Becraft et al. | 33/286 |

FOREIGN PATENTS OR APPLICATIONS

| | | | |
|---|---|---|---|
| 507,008 | 6/1920 | France | 240/6.41 |
| 414,193 | 6/1910 | France | 240/6.41 |

Primary Examiner—Richard E. Aegerter
Assistant Examiner—Richard R. Stearns
Attorney, Agent, or Firm—Robert P. Gibson; Nathan Edelberg; Max L. Harwell

[57] ABSTRACT

An aiming light and an aiming light adapter combination moulded together wherein the aiming light adapter is connected to a weapons adapter, which is in turn locked onto a weapon. A projecting lens is held within the forward end of the aiming light housing by a lens retainer having a transparent window. A removable screw threaded end cap on the back portion of the aiming light housing is used to tighten down on a dry cell battery and an electronic pulser canister. The canister and battery fit snugly around the inside of the aiming light housing with a beveled front end of the canister pressed up against a beveled canister retainer when the end cap is tightened. The beveled canister retainer has a circular aperture through which a light emitting diode, attached to the canister, is passed. The diode is electrically connected to the output of the electronic pulser circuitry. The output light beam from the diode is aligned along the optical axis of the aiming light since the beveled canister retainer prevents any traverse motion of the canister.

The aiming light adapter has horizontal and vertical adjusting and locking means for positioning the aiming light beam with respect to the bore alignment of the weapon. The aiming light beam may be of the invisible infrared spectrum for observation by an operator at nighttime when using an infrared sensitive image intensifier, or the aiming light beam may be visible and be observed either at night or during the day be the naked eye.

5 Claims, 5 Drawing Figures

3,867,764

AIMING LIGHT AND AIMING LIGHT ADAPTER FOR USE ON A WEAPON

BACKGROUND AND SUMMARY OF THE INVENTION

The aiming light of the present invention is smaller, lighter, and has a narrower light beam width than previous aiming lights, making the aiming light desirable for use in boresight alignment of a weapon and for target illumination while the weapon is being fired. The aiming light adapter, attached by a moulded portion to the aiming light, is tongue and grooved to a weapons adapter that is firmly secured to the weapon being aligned and fired.

The aiming light comprises an electronic pulser having hybrid circuitry of thin film-thick film technology enclosed in a canister and a laser diode that is attached at the output end of the canister and is pulsed by the hybrid circuitry. A battery at the input end of the canister energizes the hybrid circuitry. A double-convex projecting lens at the output end of the aiming light narrows the beam width of the light pulses emitted from the laser diode such that only a small cross-section of the target is illuminated to provide more accurate boresight alignment of the weapon.

The inside portion of the aiming light housing has a circular beveled canister retainer extending out from the walls forming a central aperture through which the diode, attached to the canister, passes through. The outer surface of the canister fits snugly against the inside portion of the aiming light housing and has a beveled front portion that contacts the beveled canister retainer such that when pressure is applied to the canister through the battery by tightening a screw-threaded end cap on the back portion of the aiming light housing, the canister retainer flexes forward and further insures that the canister does not have movement traverse to the optical axis of the aiming light.

DETAILED DESCRIPTION OF THE PREFERRED EMBODIMENT

Figure 1:
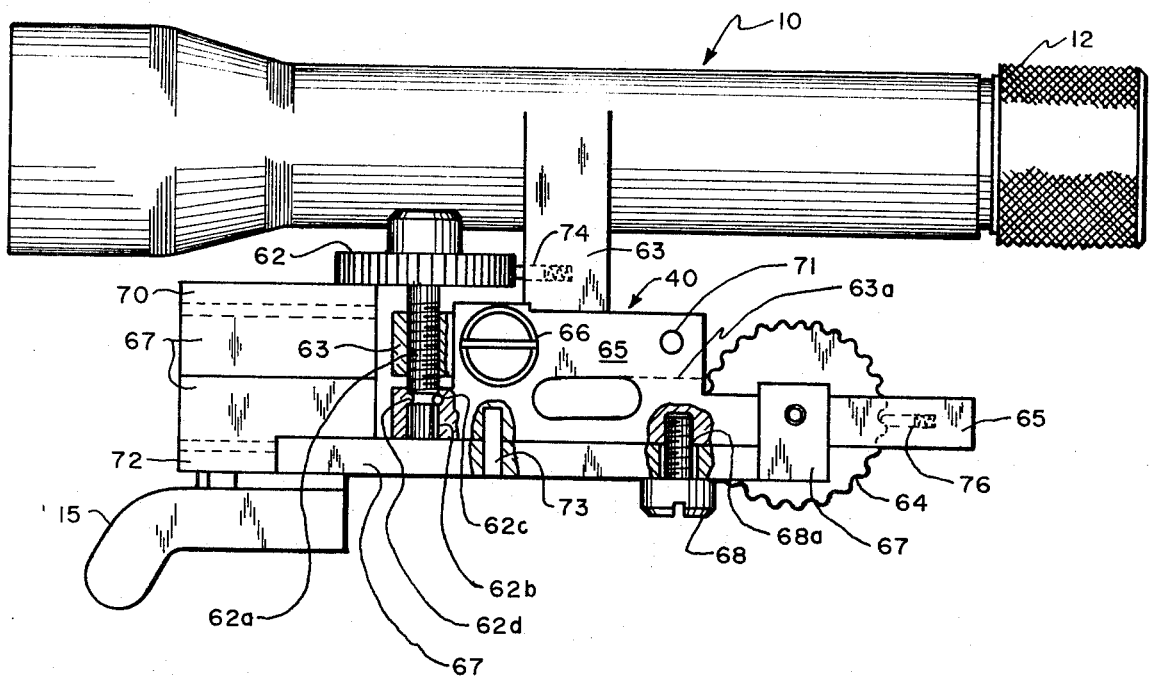
FIG. 1 illustrates a side view of the aiming light and aiming light adapter of the present invention.

FIG. 1 illustrates the aiming light 10 and the aiming light adapter 40 of the present invention. The aiming light and aiming light adapter are connected together by a moulded portion 63. A vertical housing plate 65 is attached to portion 63 to rotate about a horizontal pin extending from 63 through 65 to form a vertical piot 71. Plate 65 is locked to portion 63 by vertical locking screw 66 which has a vertical locking screw threaded stem 66a (see FIG. 2) passed through an elongated opening, having opposite ends 66b and 66c, in plate 65 and screw threaded into portion 63. The elongated opening is needed for stem 66a to move therein while plate 65 is pivoted about portion 63. A vertical boresight adjusting knob 62 has a vertical boresight adjusting screw 62a moulded thereto for threading through moulded portion 63, and a smooth portion at the end thereof seated into vertical boresight seat 62b. The smooth portion simply turns within seat 62b while being retained by pin 62c. Pin 62c is secured in plate 65 and rides in notch 62d of the smooth portion so that the smooth portion is retained in plate 65 yet allows some play therein. A groove portion 67 of the aiming light adapter is attached to plate 65 and pivots about a pin extending from 65 through 67 to form a horizontal pivot 73. Plate 65 and portion 67 are locked together by horizontal locking screw 68 that has a horizontal locking screw threaded stem 68a passed through an elongated opening in portion 67 and screw threaded into plate 65. The elongated opening in 67 allows 67 to move in the horizontal direction with stem 68a partially threaded into plate 65 and then be tightened down to lock plate 65 and portion 67 together. Screw 68 is used to lock the aiming light in a selected horizontal direction after the aiming light has been adjusted in the horizontal direction relative to the weapon by a horizontal boresight adjusting knob 64 that is connected between 65 and 67. The horizontal boresight adjusting knob 64 has a horizontal boresight adjusting screw 64a, a smooth portion at the end seated into horizontal boresight seat 64b, pin 64c, and notch 64d, which function the same as 62a, 62b, 62c, and 62d as explained above. Operation of the horizontal and vertical adjusting means of the aiming light adapter will be explained in more detail below.

Figure 2:
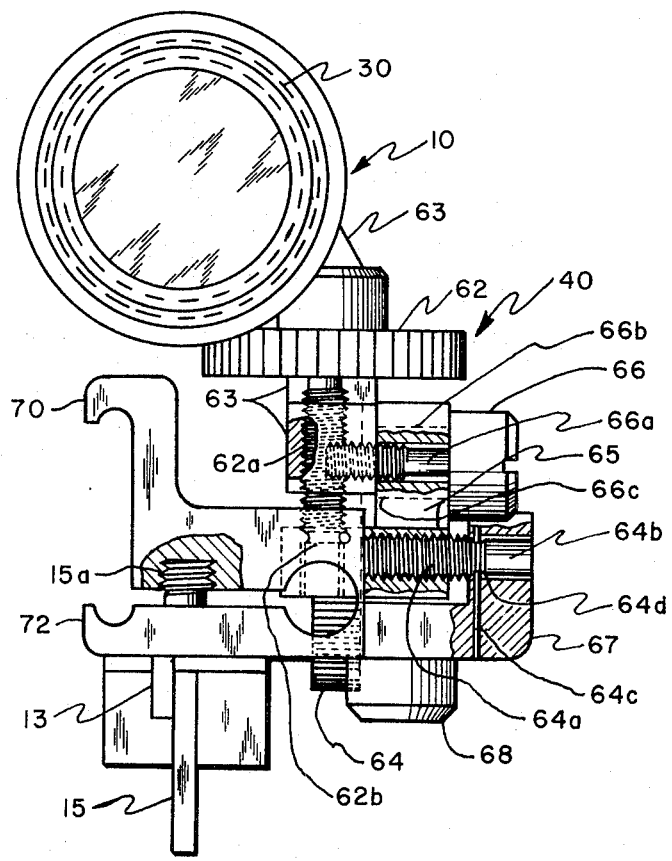
FIG. 2 illustrates a front view of FIG. 1 showing the aiming light and aiming light adapter.
Figure 3:
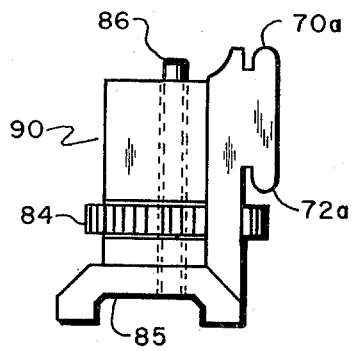
FIG. 3 illustrates the weapons adapter disattached from both the weapon and the aiming light adapter.

FIGS. 2 and 3 show, respectively, the aiming light adapter 40 having the aiming light mounted thereto and the weapons adapter 90 for locking on a weapon. The weapons adapter 90 is not a part of the invention. Adapter 90 is adapted to fit in a conventional carrying handle of a weapon (not shown) and is attached to the weapon before the aiming light adapter is attached thereto. A flat angle portion 85 is fitted on the weapon barrel side of the carrying handle and is then locked to the carrying handle by screw threading a locking pin 86 into an opening in the weapon carrying handle that pin 86 fits snugly into. Weapons adapter securing knob 84 is screw threaded with locking pin 86 such that by turning knob 84 pin 86 is moved in and out of the carrying handle.

After weapons adapter 90 is secured to the weapon with the tongue portion, including upper rim 70a and lower rim 72a, on the left side of the weapon, the groove portion of the aiming light adapter 40 is attached thereto. The groove portion of 40 includes brackets 70 and 72. Refer now to FIG. 2, which shows the light output end of the aiming light and adapter as they would be mounted on the weapons adapter, upper bracket 70 and lower bracket 72 of the aiming light adapter are slipped over upper rim 70a and lower rim 72a of the weapons adapter. The relative distance between brackets 70 and 72 is adjustable by turning aiming light adapter locking nut 15 that has a locking nut stem 15a screw threaded into the upper part of the groove portion 67. The screw threads of 15a are specifically made course, such as 28 threads per inch, so that the turning of locking nut 15 though only 180° causes the upper part of 67 to close on the lower part of 67 sufficiently tight enough that rims 70a and 72a are immoveably secured in brackets 70 and 72. In FIGS. 1 and 2, locking nut 15 is shown in the tightened position, i.e., the locking nut forward and against locking nut stop 13. When the tongue portion of 90 is being fitted into the groove portion of 40, locking nut 15 is rotated to open brackets 70 and 72 as much as possible. The amount of rotation for 15 is limited to a little over 180° since the weapons barrel is in the way. After the aiming light bracket 40 is attached to the weapons bracket 90 and is tightly secured together by turning locking nut 15 all the way against stop 13, the aiming light beam emitted from 10 is ready for alignment. After groove portion 67 is secured to the weapons adapter 90, the operator turns horizontal boresight adjusting knob 64 to align the aiming light beam horizontally to the desired position and then horizontal locking screw 68 is tightened to lock the aiming light in the horizontal direction. The aiming light beam is then positioned vertically by turning vertical boresight adjusting knob 62 and then locking portion 63 to plate 65 by tightening vertical locking screw 66.

Figure 4:
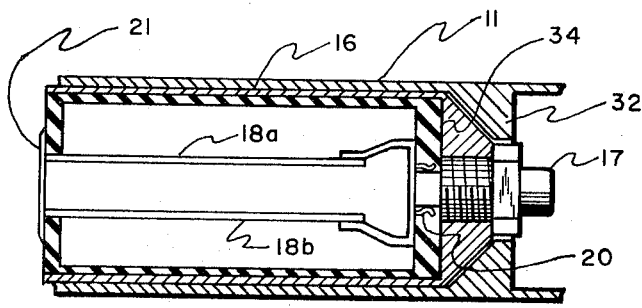
FIG. 4 shows a sectional view of the electronic pulser canister and aiming light housing.
Figure 5:
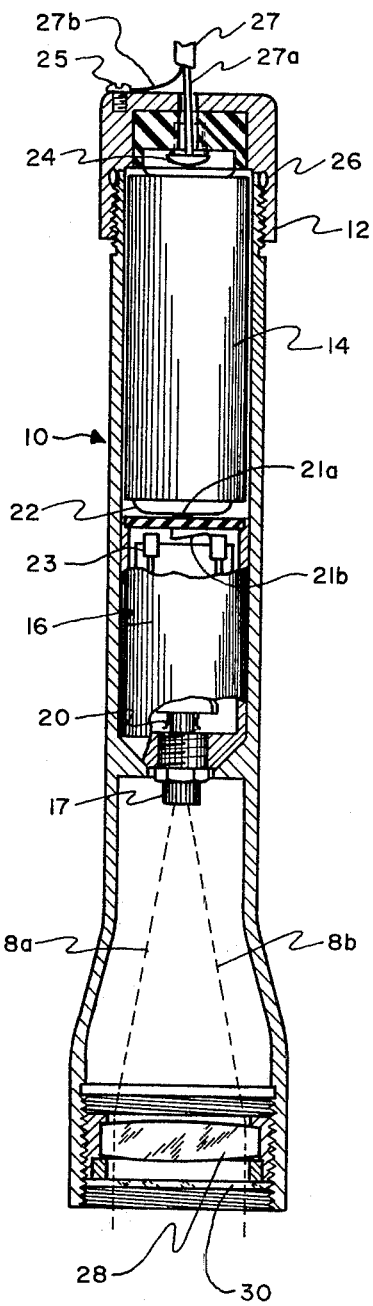
FIG. 5 illustrates a partially sectional view of the aiming light and its components.

The aiming light of the present invention is illustrated in FIG. 5, with FIG. 4 showing an enlarged sectional view of an electronic pulser canister used therein. Aiming light 10 comprises a projecting lens 28, a diode housing 17 having a diode therein, an electronic pulser hybrid circuit contained in canister 16 and connected to the diode, a direct current battery 14, and a screw threaded end cap 12 that applies pressure through the battery and canister 16 against beveled canister retainer 32. The electronic pulser produces electrical pulses that drive the diode. The diode emits a pulsing light beam through lens 28. The pulsing light beam is easier identified by an operator of the weapon than a continuous light that can be produced by using the battery only as a driver for the diode. End cap 12 has a battery lead attachment 24 therein to which the battery potential is connected and a ground screw 25 to which a ground wire from a battery cable may be attached in which a potential lead 27a from the ground cable 27 may be attached by soldering, crimping, etc. to battery lead attachment 24. The other end of the leads from the battery cable may be attached to a light emitting source in the breech of the weapon that emits a light along the bore of the weapon. An explanation of the method of boresighting the weapon using the common battery cables is shown in a separate copending patent application entitled "Method of Boresight Alignment of a Weapon" filed 12 Apr. 1973 and having Ser. No. 350,659 by one of the present inventors, Michael Hacskaylo. Once the weapon is boresighted, the light emitting source is removed from the breech of the weapon and the battery leads are removed from end cap 12. An air tight O-ring 26, around the inner portion of end cap 12, meshes with the housing of aiming light 10 to prevent moisture, dust, etc. from affecting the operation of the aiming light.

The diode used in the aiming light is preferable a highly efficient room temperature operating electron injection laser diode type, such as a gallium aluminum arsenide single heterojunction chip that is doped for an emission radiation wavelength of 8,500 Angstroms. An improved low impedance diode structure and housing can be used to lower the input impedance to the diode, and such structure is shown in a separate copending patent application entitled "Low Impedance Diode Mounting Structure and Housing," filed 24 Apr. 1973 and having Ser. No. 354,067 by one of the present inventors, Michael Hacskaylo, in which the diode structure may be used to improve the light output of the diode. Another copending patent application entitled "Laser Beam Focusing Micro-Integrator," filed 24 May 1973 and having Ser. No. 363,765 by the same inventor, Michael Hacskaylo, discloses an optically polished cylindrical light pipe to narrow the beam width and enhance the laser diode output. The low impedance package increases the light beam output from the laser diode, and the laser beam focusing micro-integrator narrows the beam width of the output from the diode.

The projecting lens 28 is secured in the output end of aiming light 10 by a screw threaded lens retainer 30. Retainer 30 has a transparent window that light beams from the laser diode, represented by beams 8a and 8b, readily pass through. Lens 28 is a double-convex, 21 millimeter diameter single lens coated for transmission at 8,500 A by using an f/2.44 infrared antireflection coating. The glass is a boresilicate crown glass type $x$, with an index of refraction of 1.7, and low dispersion at 8,500 A. The transmission at 8,500 A is better than 98 percent.

The battery 14 is a silver mercury type, such as a Mallory TR-118, but is not limited to this particular battery. Some of the requirements of the battery are as follows. The battery must be about 11.2 volts and operate continuously for 8 hours with a 350 milliampere-hour capacity. The battery housing fits snugly inside the interior of the aiming light housing. The battery operates in a temperature range between ± 50° Centigrade. At 50° Centigrade, 11.0 volts are required to drive the pulser circuit; at room temperature, 8.2 volts are required; at 0° Centrigrade, 6.8 volts are required; and below -20° Centrigrade, the voltage required to drive the pulser circuit is a constant at about 5.4 volts.

FIG. 5 illustrates the overall aiming light 10 comprising the electronic pulser canister 16, containing electronic circuitry therein, and battery 14 powering the electronic circuitry. Battery electrode 22 is connected to pulser input electrode 21a. The electronic pulser has a tension loaded wire 21b connected between input electrode 21a and an internal clock 23, such as a free running multivibrator, that operates at a nominal 5 kilohertz frequency and pulse width of 150 nanoseconds. The internal clock 23 is made of complementary metallic oxide semiconductor (MOS) circuitry so that the clock will operate when the voltage drops due to ambient temperature drop or the battery weakens. The input ends of the canisters shown in FIGS. 4 and 5 vary slightly. In FIG. 4, the complementary MOS circuitry, including an internal clock, is mounted on ceramic substrates 18a and 18b that is comprised of discrete thick-film capacitors and thin-film resistors on each substrate for producing a 5 kilohertz output pulses. The output pulses from substrates 18a and 18b are applied through circular shaped vector clip 20 to one side of a diode (not shown) within diode housing 17. The output pulses from substrates 18a and 18b are 5 volt 25 ampere pulses of 5 kilohertz frequency and 15 nanoseconds bandwidth. The other side of the diode is grounded to canister 16 through diode housing 17. The average output power of the light beam from the diode is about 0.6 to 0.95 milliwatts.

Typical size and weight of the laser aiming light and aiming light adapter are as follows. The dimensions of the aiming light housing 11 are 6.25 inches long, 0.78 inch diameter at the end cap, and 1.2 inches diameter at the lens compartment. The aiming light and aiming light adapter is 6.35 ounces total weight with component weights as follows: housing 11 with aiming light adapter 40 is 4.58 ounces, lens 28 and lens retainer 30 is 0.32 ounces, the pulser and diode is 0.41 ounces, and the battery 14 is 1.04 ounces.

We claim:

1. An aiming light for aiming a small caliber weapon comprising:

an aiming light housing comprising a projecting lens held in the forward end of said housing by a transparent window lens retainer and a screw threaded end cap threadably connected on the back end of said housing;

a light emitting means within said housing wherein said light emitting means comprises a dry cell battery positioned adjacent said cap, a canister containing an electronic pulser circuit having a beveled outer edge at an output end which fits snugly against a beveled canister retainer connected to said housing adjacent said projecting lens and an input end adjacent to and in electrical contract with one terminal of said battery, and circuit means including an electrical contact mounted on said cap for electrically connecting the other terminal of said battery with the input end of said canister retainer, with said output end having a light emitting diode therein whereby tightening of said cap on said housing completes the circuit between said battery and said input end of said canister, causing a pulsing light beam to be emitted from said light emitting diode; and an aiming light adapter attached between said weapon and said aiming light housing, said adapter comprising a vertical adjusting means and a horizontal adjusting means wherein said vertical adjusting means is connected to a moulded portion of said aiming light housing and positions said pulsing light beam in the vertical direction and wherein said horizontal adjusting means is connected to said vertical adjusting means and positions said pulsing light beam in the horizontal direction.

2. An aiming light as set forth in claim 1 wherein said vertical adjusting means and horizontal adjusting means comprise:

a vertical housing plate having a horizontal pivot hole on the back part thereof through which a horizontal pin extending from the back section of said moulded portion fits;

a vertical boresight adjusting knob and stem, said stem having a smooth portion at its end and threaded portion adjacent said knob with a notched groove between said smooth and threaded portions wherein said stem is threaded through a front section of said moulded portion in a direction perpendicular to said horizontal pin and said smooth portion is seated and held in a front part of said vertical housing plate by a pin fitted in said notched groove;

a vertical locking screw having a head resting against said vertical housing plate and a stem loosely fitted through the front part of said vertical housing plate and screw threaded into the front section of said moulded portion;

a groove portion adapted for connection to a tongue portion on said smaller caliber weapon, said groove portion having a vertical pivot hole in the mid part thereof through which a pin extending from said vertical housing plate fits;

a horizontal boresight adjusting knob and stem, said stem having a threaded portion adjacent said knob that is threaded through said back part of said vertical housing plate and a smooth portion at the end of said stem with a notched groove between said threaded and smooth portions wherein said stem is seated and held in the back portion of said groove portion by a pin fitted in said notched groove; and a horizontal locking screw having a head resting against and a stem loosely fitted through the back part of said groove portion and screw threaded into the back part of said vertical housing plate whereby rotation of said horizontal boresight adjusting knob and stem screw threads said stem through the vertical housing plate to pivot the optical axis of said housing in the horizontal direction about a vertical axis and said horizontal locking screw locks said vertical housing plate to said groove portion after alignment of said optical axis in the horizontal direction and whereby rotation of said vertical boresight adjusting knob stem screw threads said stem through the moulded portion to pivot the optical axis of said housing in the vertical direction about a horizontal axis and said vertical locking screw locks said moulded portion to said vertical housing plate after alignment of said optical axis in the vertical direction.

3. An aiming light and aiming light adapter as set forth in claim 11 wherein said projecting lens is a double-convex 21 millimeter diameter single lens that narrows the beam width of said aiming light beam emitted from said light emitting diode.

4. An aiming light and aiming light adapter as set forth in claim 3 wherein said light emitting diode is an electron injection laser diode.

5. An aiming light and aiming light adapter as set forth in claim 4 wherein said electron injection laser diode is a gallium aluminum arsenide single heterojunction chip.

* * * * *

UNITED STATES PATENT OFFICE
CERTIFICATE OF CORRECTION

PATENT NO. : 3,867,764
DATED : 25 February 1975
INVENTOR(S) : Howard L. Dunmire and Michael Hacskaylo It is certified that error appears in the above-identified patent and that said Letters Patent are hereby corrected as shown below:

Column 1, immediately after the title insert the "Government Clause": --The invention described herein may be manufactured, used, and licensed by or for the Government for governmental purposes without the payment to us of any royalty thereon.--. Column 6, line 42, the claim reference numeral "11" should read -- 1 --.

Signed and sealed this 24th day of June 1975.

(SEAL)
Attest:

RUTH C. MASON
Attesting Officer

C. MARSHALL DANN
Commissioner of Patents
and Trademarks